(12) United States Patent
High et al.

(10) Patent No.: US 10,472,051 B2
(45) Date of Patent: Nov. 12, 2019

(54) APPARATUS AND METHOD FOR STABILIZING AN UNMANNED AERIAL SYSTEM

(71) Applicant: Walmart Apollo, LLC, Bentonville, AR (US)

(72) Inventors: Donald R. High, Noel, MO (US); Michael D. Atchley, Springdale, AR (US); John P. Thompson, Bentonville, AR (US); Chandrashekar Natarajan, San Ramon, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 366 days.

(21) Appl. No.: 15/342,980

(22) Filed: Nov. 3, 2016

(65) Prior Publication Data
US 2017/0129591 A1    May 11, 2017

Related U.S. Application Data

(60) Provisional application No. 62/251,429, filed on Nov. 5, 2015.

(51) Int. Cl.
*B64C 17/04* (2006.01)
*B64C 25/52* (2006.01)
(Continued)

(52) U.S. Cl.
CPC .............. *B64C 17/04* (2013.01); *B64C 25/52* (2013.01); *B64C 27/08* (2013.01); *B64C 39/024* (2013.01);
(Continued)

(58) Field of Classification Search
CPC ........ B64C 2025/325; B64C 2027/005; B64C 17/00; B64C 17/04; B64C 2201/024;
(Continued)

(56) References Cited

U.S. PATENT DOCUMENTS

| | | | |
|---|---|---|---|
| 1,079,508 A * | 11/1913 | Menzl et al. | B64C 17/00 244/80 |
| 3,053,480 A * | 9/1962 | Vanderlip | B64C 27/54 244/17.13 |

(Continued)

FOREIGN PATENT DOCUMENTS

| | | |
|---|---|---|
| CN | 101973393 A | 2/2011 |
| CN | 203577324 U | 5/2014 |

(Continued)

OTHER PUBLICATIONS

PCT; App. No. PCT/US2016/060286; International Search Report and Written Opinion dated Feb. 6, 2017.

(Continued)

*Primary Examiner* — Medhat Badawi
*Assistant Examiner* — Christopher D Hutchens
(74) *Attorney, Agent, or Firm* — Fitch, Even, Tabin & Flannery LLP (57) ABSTRACT

Systems, apparatuses, and methods are provided herein for stabilizing an unmanned aerial system. An apparatus for stabilizing an unmanned aerial system comprises a ring member and a pair of attachment members each having a first end and a second end, the first end being configured to attach to a multicopter and a second end being coupled to the ring member. Wherein the pair of attachment members holds the ring member such that a plane of a circumference of the ring member is generally parallel to blades of the multicopter.

17 Claims, 5 Drawing Sheets

(51) Int. Cl.
*B64C 27/08* (2006.01)
*B64C 39/02* (2006.01)
*B64C 25/32* (2006.01)

(52) U.S. Cl.
CPC .. *B64C 2025/325* (2013.01); *B64C 2201/027* (2013.01); *B64C 2201/108* (2013.01); *B64C 2201/128* (2013.01); *B64C 2201/18* (2013.01)

(58) Field of Classification Search
CPC . B64C 2201/12; B64C 2201/18; B64C 25/52; B64C 27/008; B64C 27/08
See application file for complete search history.

(56) References Cited

U.S. PATENT DOCUMENTS

| | | | | |
|---|---|---|---|---|
| 4,478,379 | A * | 10/1984 | Kerr | B64C 27/10 |
| | | | | 244/120 |
| 9,688,404 | B1 * | 6/2017 | Buchmueller | B64D 1/12 |
| 10,081,432 | B2 * | 9/2018 | Rossi | B64C 27/08 |
| 2009/0075551 | A1 | 3/2009 | Chui | |
| 2012/0018579 | A1 | 1/2012 | Yan | |
| 2014/0099853 | A1 | 4/2014 | Condon | |
| 2014/0263823 | A1 | 9/2014 | Wang | |
| 2015/0291272 | A1 * | 10/2015 | Yan | B64C 1/00 |
| | | | | 244/119 |
| 2015/0321759 | A1 | 11/2015 | Caubel | |
| 2016/0001883 | A1 * | 1/2016 | Sanz | B64F 1/02 |
| | | | | 244/17.23 |
| 2016/0196756 | A1 * | 7/2016 | Prakash | B64C 39/024 |
| | | | | 701/3 |
| 2016/0332739 | A1 | 11/2016 | Wong | |
| 2017/0190446 | A1 * | 7/2017 | Williams, Sr. | B64G 1/14 |
| 2018/0002035 | A1 * | 1/2018 | Neely | B64D 47/08 |

FOREIGN PATENT DOCUMENTS

| | | |
|---|---|---|
| CN | 104149971 A | 11/2014 |
| CN | 104443366 A | 3/2015 |
| WO | WO-2014080386 A2 * | 5/2014 ........... B64C 39/024 |
| WO | 2014080386 | 4/2015 |

OTHER PUBLICATIONS

Brown, James; "Tarot 680Pro TL65B44 retracts", https://www.youtube.com/watch?v=32X3QUINNDs, Feb. 5, 2015, pp. 1-5.

Dansie, Jonathan; "Model Aircraft Design: A teaching series for secondary students", 2011, pp. 1-49.

Perry, Tekla S.; "Package Delivery by Drone", IEEE Spectrum, http://spectrum.ieee.org/view-from-the-valley/robotics/drones/package-delivery-by-drone, Jul. 28, 2015, pp. 1-3.

rc-drones.com; "HexaKong XL-6S Hex/HexaCopter Drone DJI S800 Retractable Landing Gear+PhotoHigher AV200+RSGS Skyline", https://www.youtube.com/watch?v=TybfoRVrVWQ, May 22, 2013, pp. 1-5.

Rcdepot Hobbies; "Phantom 3 Retractable Landing Gear Installation Instruction", https://www.youtube.com/watch?v=QNgcllCaQal, Jul. 21, 2015, pp. 1-12.

* cited by examiner

APPARATUS AND METHOD FOR STABILIZING AN UNMANNED AERIAL SYSTEM

CROSS-REFERENCE TO RELATED APPLICATION

This application claims the benefit of U.S. Provisional Application No. 62/251,429, filed Nov. 5, 2015, which is incorporated herein by reference in its entirety.

TECHNICAL FIELD

This invention relates generally to unmanned aerial systems.

BACKGROUND

Unmanned aerial systems (UAS) generally refer to aircraft without a human pilot onboard. Initially developed for the military, UASs are increasing being used for recreational and commercial applications.

BRIEF DESCRIPTION OF THE DRAWINGS

Disclosed herein are embodiments of apparatuses and methods for stabilization for unmanned aerial systems. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for stabilizing an unmanned aerial system. An apparatus for stabilizing an unmanned aerial system comprises a ring member and a pair of attachment members each having a first end and a second end, the first end being configured to attach to a multicopter and a second end being coupled to the ring member. Wherein the pair of attachment members hold the ring member such that a plane of a circumference of the ring member is generally parallel to blades of the multicopter.

Unmanned aircraft systems are often designed to carry a gimbal and camera and have long legs to protect the gimbal and camera from hitting the ground. The weight of the gimbal and camera can serve as a counterweight to the drone assembly and helps balance the drone during landing. When the gimbal and camera are removed, a drone tends to become top heavy. The weight imbalance may be compensated for when the drone is carrying a package, but once the package is delivered, the drone may become too top heavy to land safely.

Unmanned Aircraft Systems (UAS) may be configured to carry and deliver packages which are typically carried under the UAS. A UAS may also be referred to as a drone herein. Upon the delivery of the packages, however, the UAS may become top heavy and unbalanced. A UAS stabilizer is described herein that can be attached to a UAS to provide stability. The retractable stabilizer may include a frame that may be attached to the drone by the landing gear of the UAS that can be raised and lowered. The frame may be made of a lightweight material that is also strong enough to support the weight of the drone. In some embodiments, the frame may surround the drone and extend to approximately the same span as the wings when fully extended. The frame of the stabilizer may be attached to the legs of the drone through one or more hinges that allow the drone to raise or lower the stabilizer with the landing gear. The stabilizer frame may be positioned and designed to allow the drone to safely land regardless of whether it is carrying a package or not. The stabilizer generally does not interfere with landing or delivery of packages whether the landing gear is up or down. In some embodiments, the stabilizer may be implemented in different shapes or configurations which may be dependent on a number of motors, blades, and wings of the UAS.

In some embodiments, the stabilizer frame may be attached to the drone by the legs of the drone. The attachment between the frame and the legs of the drone may be flexible enough to stay coupled but yet hinges in a way which allows the drone to raise or lower the landing gear with the stabilizer attached.

In some embodiments, the stabilizer may be of a hexagonal shape to protect the six engines of a hexacopter. In other embodiments, the stabilizer may be square, octagonal, or circular depending on the number of motors, blades, and wing on the drone. UAS stabilizers described herein generally provide additional support to a top-heavy drone to prevent the drone from tipping over when landing. The stabilizers may provide stability when the landing gear of the drone is up or down. The configuration of the stabilizer may be adjusted to fit different drone designs, is lightweight, and is strong enough to withstand typical landings. Generally, the stabilizer is configured to extend from the landing gear to accommodate the imbalance of the weight on a drone. The stabilizer may be flexible enough to stay coupled to the landing gear, be light enough to not impact flying, and be strong enough to withstand the impact of landing.

Figure 1:
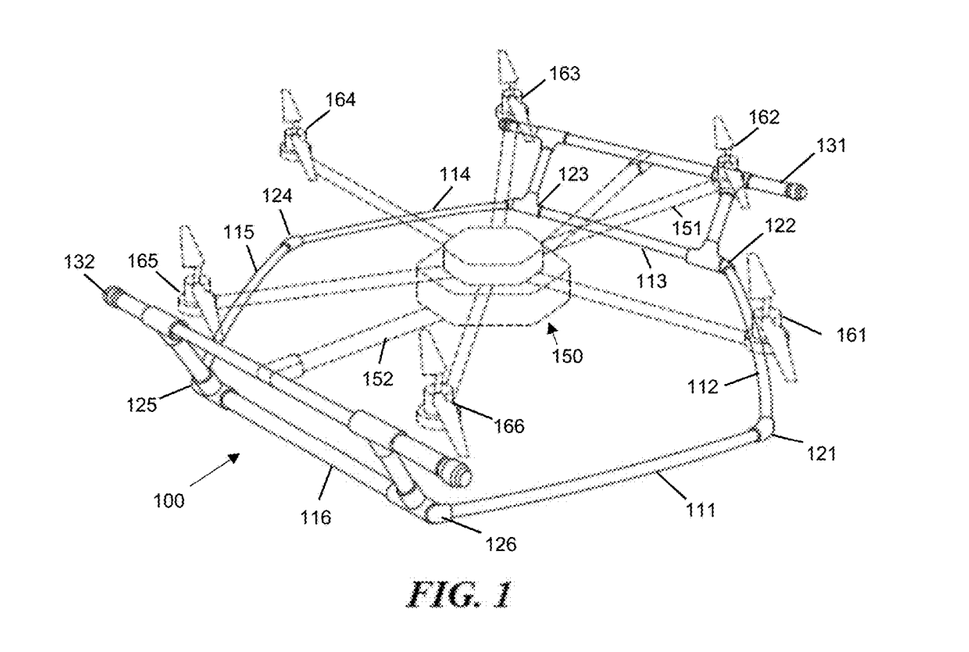
FIG. 1 is an illustration of a UAS stabilizer coupled to a UAS in accordance with several embodiments.
Figure 2:
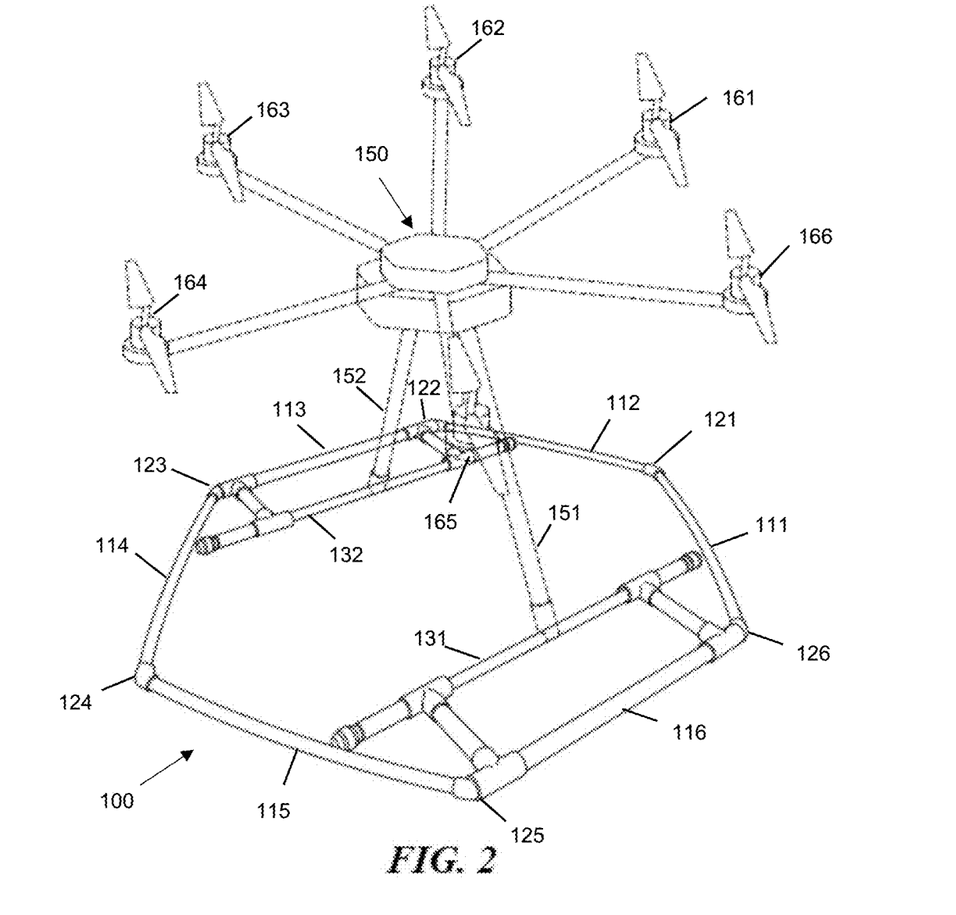
FIG. 2 is another illustration of a UAS stabilizer coupled to a UAS in accordance with several embodiments.

Referring now to FIGS. 1 and 2, a UAS stabilizer 100 attached to a UAS 150 is shown. The UAS stabilizer 100 includes six sides 111, 112, 113, 114, 115, and 116 and six vertices 121, 122, 123, 124, 125, and 126. Generally, the sides and vertices of the stabilizer 100 form the ring portion of the UAS stabilizer 100 that hangs below the UAS 150. The UAS stabilizer 100 further includes attachment members 131 and 132 for coupling with the UAS 150. In FIGS. 1 and 2, the attachment members 131 and 132 each includes two vertical bars that attach to sides 113 and 116 of the ring portion via hinges and a horizontal bar for coupling with the UAS 150.

In some embodiments, the hinges coupling the attachment members 131 and 132 to the ring portion of the UAS stabilizer 100 allows the attachment members 131 and 131 to pivot in a generally perpendicular plane with respect to elongated members comprising the sides 113 and 116 of the ring portion. In some embodiments, the hinges may comprise one or more of a knuckle joint, a turnbuckle, a pin joint, a cotter joint, a bolted joint, a screw joint, and the like. In some embodiments, the horizontal bars and the vertical bars of the attachment members 131 and 132 may also be coupled via a hinge that allows the vertical bars to pivot with respect to the horizontal bar. For example, a joint coupling the vertical bar and the horizontal bar may allow the horizontal bar to rotate within the socket formed by one end of a vertical bar. A more detailed description of attachment members in accordance with several embodiments are provided herein with reference to FIGS. 3A-B.

In some embodiments, the ring portion and/or the attachment structures of the stabilizer may comprise a lightweight material such as hollow PVC, carbon fiber, aluminum, and the like. Generally, the stabilizer may comprise any material including metal, plastic, wood, and composite material that can withstand the impact force of a typical landing while staying sufficiently below the UAS's carrying weight capacity to permit the UAS 150 to fly with both the UAS stabilizer 100 and a package attached. In some embodiments, the diameter of the ring portion may be approximately the same as the width of the wing/arm span of the UAS 150. In some embodiments, the circumferences of the ring portion may be slightly narrower or wider than the wing span of the UAS 150.

The UAS 150 may generally be a multicopter-type unmanned aerial system configured for vertical takeoff and landing and for carrying additional weight in flight. In FIGS. 1 and 2, the UAS 150 is shown as a hexacopter having six arms and propellers 161, 162, 163, 164, 165, and 166 and a pair of landing gear legs 152 and 151. In some embodiments, the UAS 150 may be configured to raise the landing gear as shown in FIG. 1 while in flight and lower the landing gear as shown in FIG. 2 for landing. The landing gear leg 152 is coupled to the attachment member 132 and the landing gear leg 152 is coupled to the attachment member 131 of the UAS stabilizer 100. In some embodiment, the landing gear legs 151 and 152 comprises a notch at the bottom of each leg for receiving the vertical bars of the attachment members 131 and 132. In some embodiments, the landing gear legs 151 and 152 may be removably attached to the attachment members 131 and 132 via a joint, a hinge, etc. on the legs 151 and 152 and/or the attachment members 131 and 132. Generally, the landing gear legs 151 and 152 may be coupled to the UAS stabilizer 100 such that the landing gear legs 152 may pivot relative to the vertical bars of the attachment members 131 and 131.

In some embodiments, the UAS 150 may further include a package coupling structure (not shown) that extends below the UAS 150 for coupling with a package. The coupling structure may comprise one or more of a hook, loop, hanger, etc. In some embodiments, the package coupling structure may extend through the center of the ring portion of the UAS stabilizer 100 between the attachment members 131 and 132 to couple to a package. While the UAS 150 is shown as a hexacopter, other types of UASs may also be coupled to a UAS stabilizer as described herein. For example, while the UAS 150 includes six arms and a propeller on each arm, in some embodiments, the UAS may comprise any number of arms and one or more propellers on each arm. Each arm and/or the body of the UAS 150 may further include one or more motors for driving the propellers.

In FIGS. 1 and 2, the stabilizer 100 and the UAS 150 are coupled in an orientation such that each of the vertices 121-126 of the ring portion of the stabilizer 100 is positioned below a propeller 161-166 of the UAS 150 respectively. During landing, the vertices 121-126 may prevent the stabilizer 100 and the UAS 150 from tipping over at the point of the vertices 121-126, thus protecting each arm and propeller 161-166 from bearing the full force of impact in the event that the UAS 150 does topple during landing.

In FIG. 1, the landing gear legs 151 and 152 of the UAS 150 are raised, and the attachment members 131 and 132 of the UAS stabilizer 100 are lifted with the raising of the landing gear legs 151 and 152. In the lifted position, the attachment members 131 and 132 are rotated up and outward away from the center of the ring portion of the stabilizer 100. In FIG. 2, the attachment members 131 and 132 are folded with the lowering of the landing gear legs 151 and 152. In the folded position, the attachment members 131 and 132 are rotated inward toward the center of the ring portion of the stabilizer 100 such that the attachment members 131 and 132 becomes approximately in the same plane as the ring portion of the UAS stabilizer 100. In both FIG. 1 and FIG. 2, and the transition between the two positions, the ring portion of the stabilizer 100 generally remains parallel to the plane of the propellers 161-166 and/or the arms of the UAS 150. As such, whether the landing gear legs 151 and 152 are in an up or a down position when the UAS 150 approaches ground for landing, the ring portion of the stabilizer comes into contact with the ground first. The ring portion of the stabilizer 100 is also configured to contact the ground first if the UAS 150 lands at an angle (e.g. plane of the propeller being 30 degrees, 40 degrees, etc. with respect to the ground). The weight of the stabilizer 100 further lowers the center of gravity of the UAS 150 such that the UAS 150 is less likely to topple when it lands at an angle. For example, if the UAS 150 lands at an angle, the weight of the stabilizer 100 would pull the UAS 150 back to a horizontal position when a portion of the stabilizer 100 makes contact with the ground first.

While a hexacopter and a hexagonal stabilizer are shown in FIGS. 1 and 2, in some embodiments, the stabilizer may comprise a polygonal ring having a number of vertices equal to the number of one or more of motors, blades, and wings of the multicopter. For example, a triangular stabilizer may be coupled to a tricopter, a square stabilizer may be coupled to a quadcopter, an octagonal stabilizer may be coupled to an octocopter, etc. In some embodiments, the pair of attachment members is further configured to hold the ring member such that each vertex of the polygonal ring is aligned with one or more of a motor, blade, and wing of the multicopter. In some embodiments, the ring member may comprise one or more apertures without departing from the spirit of the present disclosure. For example, one or more sides of the ring portion may have an aperture no wider than the width of a side of the ring portion. In some embodiments, the ring portion of the stabilizer may comprise a circular ring that may be used with multicopters having a different number of arms and/or propellers.

Figure 3A:
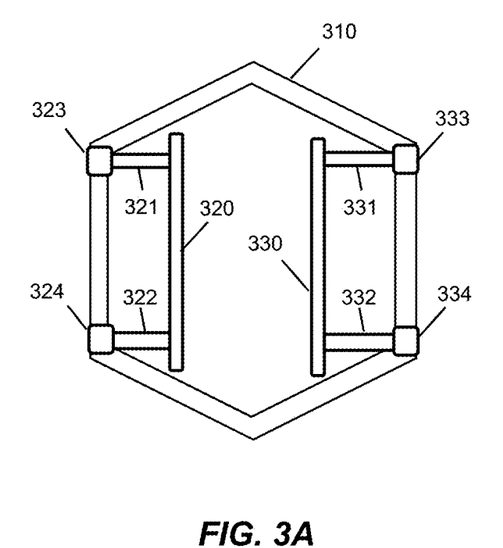
FIGS. 3A and 3B are illustrations of top views of UAS stabilizers in accordance with several embodiments.

Referring now to FIGS. 3A-B, top views of two UAS stabilizer configurations are shown. In FIG. 3A, a UAS stabilizer includes a ring portion 310, a first attachment structure having a horizontal bar 320 and two vertical bars 321 and 322, and a second attachment structure having a horizontal bar 330 and two vertical bars 332 and 332. The first attachment structure is coupled to the ring portion 310 via hinges 323 and 324 near the vertices of the ring portion 310. The second attachment structure is attached to the ring portion 310 via hinges 333 and 334 near another set of vertices of the ring portion 310. The hinges 323, 324, 333, and 334 are generally configured to allow the vertical bars 321, 322, 331, and 332 to pivot perpendicularly around the sides of the ring portion 310.

Figure 3B:
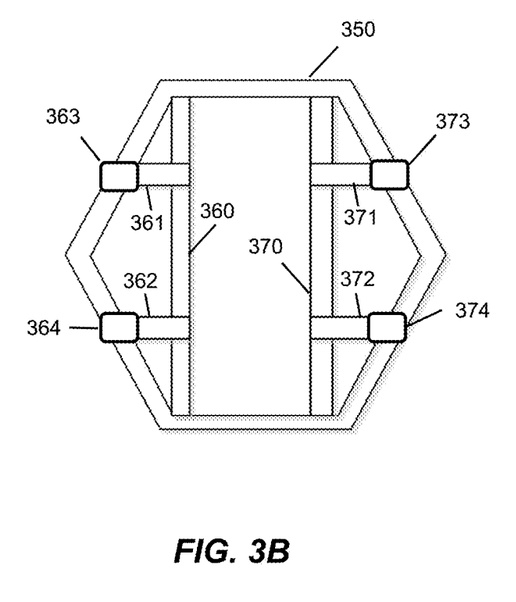

In FIG. 3B, a UAS stabilizer includes a ring portion 350, a first attachment structure having a horizontal bar 360 and two vertical bars 361 and 362, and a second attachment structure having a horizontal bar 370 and two vertical bars 371 and 372. The first attachment structure is coupled to the ring portion 350 via hinges 363 and 364 near the center of a side of the ring portion 350. The second attachment structure is attached to the ring portion 350 via hinges 373 and 374 near the center of another side of the ring portion. 350. The hinges 323, 324, 333, and 334 are generally configured to allow the vertical bars 321, 322, 331, and 332 to pivot around the sides of the ring portion 310.

The attachment structure shown in FIGS. 3A and 3B are shown as an example only. Generally, the attachment structure may be configured to couple to the ring portion of the stabilizer with the UAS while allowing the ring portion of the stabilizer to stay generally parallel to the blades of the propellers and/or the arms of the UAS in flight and during landing. In some embodiments, the vertical bars of an attachment member may be closer or further from each other than as shown. In some embodiments, an attachment member may comprise only one or more than two vertical bars. In some embodiments, an attachment member may comprise only a single elongated member that is coupled to the landing gear of the UAS on one end and the ring portion of the stabilizer on the other end, and pivots with respect to both the landing gear of the UAS and the ring portion of the stabilizer.

Figure 4A:
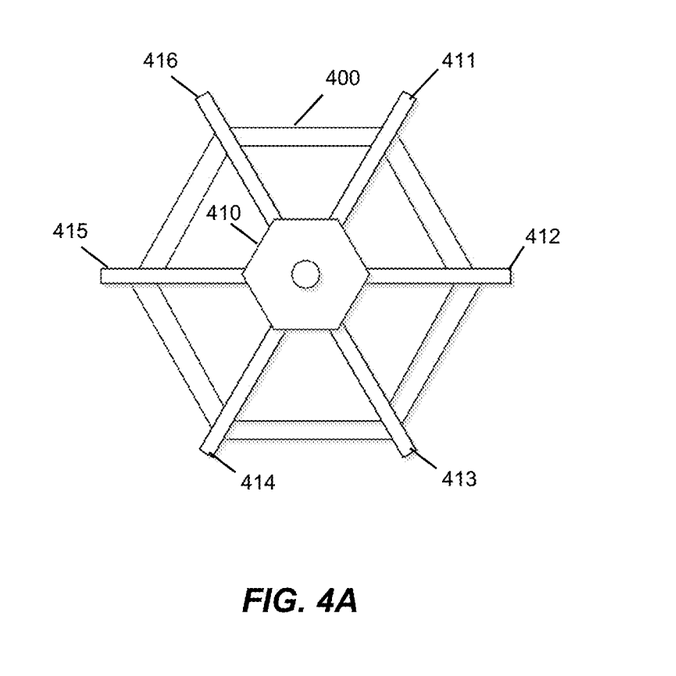
FIGS. 4A and 4B are illustrations of a top view and a side view of a UAS stabilizer coupled to a UAS in accordance with several embodiments.

Referring now to FIGS. 4 A-B, a top and a side view of a UAS 410 attached to a stabilizer 400 is shown. In FIG. 4A, the UAS 410 includes six arms, 411, 412, 413, 414, 415, and 416. Each arm 411-416 may include one or more propellers (not shown) near the tip of the arms. The motor(s) for driving the propeller blade may be located in the body of the UAS or in the arms 411-416. The stabilizer 400 comprises a hexagonal ring having six vertices. In FIG. 4A, each vertex of the stabilizer 400 may be generally pointed in the same direction as an arm 411-416. In the top view, each vertex is positioned under one of the arms and obscured from view. The attachment structure of the stabilizer 400 and the landing gear of the UAS 410 are omitted in illustration in FIG. 4A.

Figure 4B:
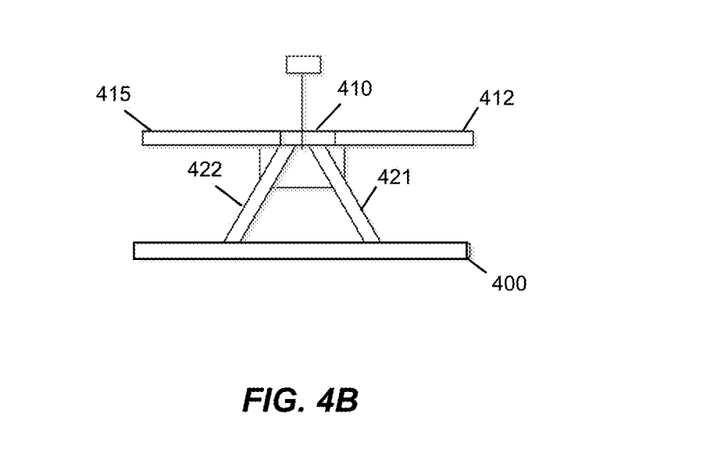

In FIG. 4B, a side view of the UAS 410 attached to the stabilizer 400 is shown. In FIG. 4B, the landing gear legs 422 and 421 are lowered, and the attachment structures of the stabilizer 400 are folded into the ring member and are therefore not visible. As shown in FIG. 4B, the plane of the circumference of the stabilizer 400 be may be generally parallel to the plane of the arms 411-416 and the blades of the propellers on each arm.

In FIGS. 1-4B, hexagonal stabilizers and hexacopters are shown to illustrate a UAS stabilizer. In some embodiments, the stabilizer may comprise a polygonal ring having different number of sides and vertices. For example, the ring portion of the stabilizer may comprise a triangle, a square, a pentagon, a heptagon, an octagon, etc. In some embodiments, the ring portion of the stabilizer may comprise the same number of vertices as the number of arms and/or propellers on the multicopter that the stabilizer is designed to be coupled to. For example, a triangular stabilizer may be coupled to a tricopter, a square stabilizer may be coupled to a quadcopter, a pentagonal stabilizer may be coupled to a pentacopter, an octagonal stabilizer may be coupled to an octocopter, etc. In some embodiments, the ring member may comprise one or more apertures without departing from the spirit of the present disclosure. For example, one or more sides of the ring portion may have an aperture no larger than the width of the side of the ring portion. In some embodiments, the ring portion of the stabilizer may comprise a circular ring that may be used with multicopters having a different number of arms.

In some embodiments, the attachment members may comprise a different configuration than what is shown in FIGS. 1-4B. For example, the vertical bars of an attachment member may be closer or further from each other than as shown. In some embodiments, the attachment member may comprise only one or more than two vertical bars. In some embodiments, the attachment member may comprise only a single elongated member that is coupled to the landing gear of the UAS on one end and the ring portion of the stabilizer on the other end, and pivots with respect to both the landing gear of the UAS and the ring portion of the stabilizer. In some embodiments, instead of being coupled to the landing gear, the stabilizer may be coupled to the body of the UAS. In some embodiments, the attachment structure of the stabilizer may be fixed, and the ring portion of the stabilizer does not raise or lower substantially relative to the UAS. In some embodiments, the stabilizer may comprise one, two, three or more attachment structures.

Figure 5:
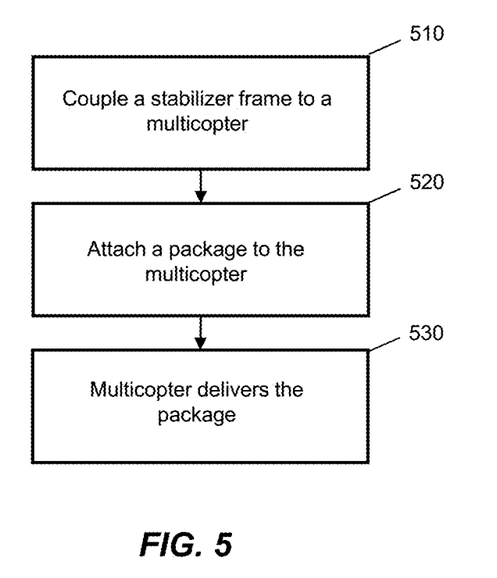
FIG. 5 is a flow diagram of a method in accordance with several embodiments.

Referring now to FIG. 5, a method for stabilizing an unmanned aerial system is shown. In step 510, a stabilizer frame is coupled to a multicopter. The stabilizer generally has a ring portion and one or more attachment structures. In some embodiments, the ring portion may comprise one or more sides and vertices matching the number of arms, propellers, and/or motors on the multicopter. In some embodiments, the ring portion may comprise a generally circular ring. The attachment structure may comprise at least one attachment member for coupling with the ring portion that permits the attachment structure to pivot relative to the ring portion.

In some embodiments, the stabilizer may be removably coupled to the UAS. In some embodiments, the stabilizer may be coupled to the landing gear of the UAS. In some embodiments, the landing gear of the stabilizer may comprise a notch, a clip, a latch, etc. for receiving the attachment structure of the stabilizer. In some embodiments, the stabilizer may comprise a notch, a clip, a latch, a hinge, etc. for attaching to the UAS. Generally, the attachment structure may be configured to hold the plane of the ring portion of the stabilizer parallel to the plane of the blades of propellers and/or the arms on the UAS. In some embodiments, the attachment structures are configured to hold the vertices of the ring portion of the stabilizer under each arm and/or propeller of the UAS. In some embodiments, coupling the stabilizer frame to the multicopter comprises aligning the vertices of the ring portion of the stabilizer with the arms and/or propellers of the UAS. In some embodiments, the UAS and the stabilizer may be coupled and decoupled by hand. For example, the stabilizer may be coupled to the UAS by inserting the attachment structure of the stabilizer through a notch on the landing gear of the UAS.

In step 520, a package is attached to the multicopter. In some embodiments, the multicopter comprises a package coupling structure such a hook, a hanger, a loop, etc. The package coupling structure may extend below the body of the multicopter and may be coupled to the body and/or one or more of the arms of the UAS. In some embodiments, the package coupling structure may extend through the center of the ring portion of the stabilizer when the stabilizer is attached to the UAS. In some embodiments, the attachment structure of stabilizer may be configured to avoid contact with the package coupling structure of the UAS whether the land gear of the UAS is raised or lowered. In some embodiments, the UAS may retrieve a package by coupling the package coupling structure with a hanger or loop on the package while in flight. In some embodiments, the package may be attached to the UAS by hand. In some embodiments, the package coupled to the UAS may hang within or below the ring portion of the stabilizer.

In step 530, the UAS delivers the package. In some embodiments, the UAS may be configured to fly with the stabilizer attached to its landing gear and the package coupled to the package coupling structure. When the UAS reaches the package's destination, the package may be decoupled from the UAS either by releasing the package coupling structure on the UAS or by hand. In some embodiments, the UAS may be configured to land with both the package and the stabilizer attached. For example, the stabilizer may be configured to accommodate the package within the ring at landing. In some embodiments, the package and/or the stabilizer may contact the ground first in such landings. After the package is delivered, the UAS may make the return flight with only the stabilizer attached. When the UAS lands with only the stabilizer attached, generally, the stabilizer contacts the ground first and prevent the UAS from toppling during landing by lowering the UAS's center of gravity during landing.

In one embodiment, an apparatus for stabilizing an unmanned aerial system comprises a ring member and a pair of attachment members each having a first end and a second end, the first end being configured to attach to a multicopter and a second end being coupled to the ring member. Wherein the pair of attachment members hold the ring member such that a plane of a circumference of the ring member is generally parallel to blades of the multicopter.

In one embodiment, a method for stabilizing an unmanned aerial system, comprises coupling a stabilizer frame to a multicopter, the stabilizer frame comprises a ring member; and a pair of attachment members each having a first end and a second end, the first end being configured to attach to the multicopter and a second end being coupled to the ring member. Wherein the pair of attachment members holds the ring member such that a plane of the circumference of the ring member is generally parallel to blades of the multicopter. In one embodiment, a stabilized unmanned aerial system, comprising: a multicopter comprising a plurality of motors and at least one blade driven by each of the plurality of motors, a stabilizer comprising, a ring member, and a pair of attachment members each having a first end and a second end, the first end being coupled the multicopter and a second end being coupled to the ring member. Wherein the pair of attachment members hold the ring member such that a plane of the circumference of the ring member is generally parallel to blades of the multicopter.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An apparatus for stabilizing an unmanned aerial system, comprising:
    a ring member; and
    a pair of attachment members each having a first end and a second end, the first end being configured to attach to a multicopter and a second end being coupled to the ring member;
    wherein the pair of attachment members hold the ring member such that a plane of a circumference of the ring member is generally parallel to blades of the multicopter;
    wherein the pair of attachment members pivots to raise the ring member when a landing gear of the multicopter is in an up position and pivots to lower the ring member when the landing gear is in a down position.

2. The apparatus of claim 1, wherein the ring member comprises a polygonal ring having a number of vertices equal to a number of one or more of motors, blades, and wings of the multicopter.

3. The apparatus of claim 1, wherein the ring member comprises a polygonal ring and the pair of attachment members are further configured to hold the ring member such that each vertices of the polygonal ring is aligned with a motor, a blade, or a wing of the multicopter.

4. The apparatus of claim 1, wherein a diameter of the ring member is equal or greater than a wing span of the multicopter.

5. The apparatus of claim 1, wherein the first end of the attachment members each attaches to a landing gear of the multicopter.

6. The apparatus of claim 1, wherein the second end of the attachment members are coupled to the ring member via hinges.

7. The apparatus of claim 1, wherein the first end of each attachment member comprises a horizontal bar and the second end of each attachment member comprises two vertical bars extending vertically from the horizontal bar.

8. A method for stabilizing an unmanned aerial system, comprising:
    coupling a stabilizer frame to a multicopter, the stabilizer frame comprising:
    a ring member; and
    a pair of attachment members each having a first end and a second end, the first end being configured to attach to the multicopter and a second end being coupled to the ring member;
    wherein the pair of attachment members holds the ring member such that a plane of a circumference of the ring member is generally parallel to blades of the multicopter,
    wherein the pair of attachment members pivots to raise the ring member when a landing gear of the multicopter is in an up position and pivots to lower the ring member when the landing gear is in a down position.

9. The method of claim 8, wherein the ring member comprises a polygonal ring having a number of vertices equal to a number of one or more of motors, blades, and wings of the multicopter.

10. The method of claim 8, wherein the ring member comprises a polygonal ring and the pair of attachment members are further configured to hold the ring member such that each vertices of the polygonal ring is aligned with a motor, a blade, or a wing of the multicopter.

11. The method of claim 8, wherein a diameter of the ring member is equal or greater than a wing span of the multicopter.

12. The method of claim 8, wherein the first end of the attachment members each attaches to a landing gear of the multicopter.

13. The method of claim 8, wherein the second end of the attachment members are coupled to the ring member via hinges.

14. The method of claim 8, wherein the first end of each attachment member comprises a horizontal bar and the second end of each attachment member comprises two vertical bars extending vertically from the horizontal bar.

15. The method of claim 8, further comprising: attaching a package to the multicopter through a center of the ring member.

16. A stabilized unmanned aerial system, comprising:
a multicopter comprising a plurality of motors and at least one blade driven by each of the plurality of motors;
a stabilizer comprising:
a ring member; and
a pair of attachment members each having a first end and a second end, the first end being coupled to the multicopter and a second end being coupled to the ring member;
wherein the pair of attachment members holds the ring member such that a plane of a circumference of the ring member is generally parallel to blades of the multicopters;
wherein the pair of attachment members pivots to raise the ring member when a landing gear of the multicopter is in an up position and pivots to lower the ring member when the landing gear is in a down position.

17. The system of claim 16, wherein the ring member comprises a polygonal ring having a number of vertices equal to a number of one or more of motors, blades, and wings of the multicopter.

* * * * *